US011364874B2

(12) United States Patent
Takano et al.

(10) Patent No.: US 11,364,874 B2
(45) Date of Patent: Jun. 21, 2022

(54) CONTROL SYSTEM OF MARINE VESSEL AND PORTABLE DEVICE FOR MARINE VESSEL

(71) Applicant: YAMAHA HATSUDOKI KABUSHIKI KAISHA, Iwata (JP)

(72) Inventors: Naoju Takano, Shizuoka (JP); Kentaro Takeda, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 344 days.

(21) Appl. No.: 16/731,313

(22) Filed: Dec. 31, 2019

(65) Prior Publication Data

US 2020/0216018 A1 Jul. 9, 2020

(30) Foreign Application Priority Data

Jan. 8, 2019 (JP) ............................ JP2019-001458

(51) Int. Cl.

*B60R 25/045* (2013.01)
*G07C 9/00* (2020.01)
*B63B 79/40* (2020.01)

(52) U.S. Cl.

CPC ........ *B60R 25/045* (2013.01); *G07C 9/00182* (2013.01); *B60R 2325/304* (2013.01); *B63B 79/40* (2020.01); *G07C 2009/00206* (2013.01); *G07C 2009/00293* (2013.01)

(58) Field of Classification Search

CPC ............ B60R 25/045; B63H 2021/216; G07C 9/00174; G07C 2009/00206; G07C 2009/00214; G07C 2009/00222

USPC ........................................................ 307/10.2

See application file for complete search history.

(56) References Cited

U.S. PATENT DOCUMENTS

| | | | | |
|---|---|---|---|---|
| 5,623,245 | A | 4/1997 | Gilmore | |
| 7,131,876 | B2 * | 11/2006 | Hattori | B63J 99/00 440/1 |
| 9,884,673 | B2 * | 2/2018 | Nakano | B63H 20/00 |
| 2005/0192735 | A1 | 9/2005 | Ito et al. | |
| 2017/0021905 | A1 | 1/2017 | Nakano et al. | |

FOREIGN PATENT DOCUMENTS

JP 2017-27840 A 2/2017

OTHER PUBLICATIONS

Official Communication issued in corresponding European Patent Application No. 19218783.9, dated Nov. 18, 2021.

* cited by examiner

*Primary Examiner* — Hai L Nguyen

(74) *Attorney, Agent, or Firm* — Keating and Bennett, LLP

(57) ABSTRACT

A control system of a marine vessel includes a portable device and a receiving device. The portable device transmits a switch control signal to the receiving device based on an input operation. The control system of the marine vessel performs an authentication control process based on an authentication signal from the portable device, and controls opening or closing of a current path based on the switch control signal from the portable device.

20 Claims, 7 Drawing Sheets

100
3
BMS
31
115b (115)
115a (115)
114
PORTABLE DEVICE
1
BATTERY
RECEIVING DEVICE
2
25
26a
26
26b
27
27a
27b
27c
27d
REMOTE CONTROL ECU
5
OUT-BOARD MOTOR ECU
4
COMMUNICATION LINE
POWER SUPPLY/ANALOG LINE

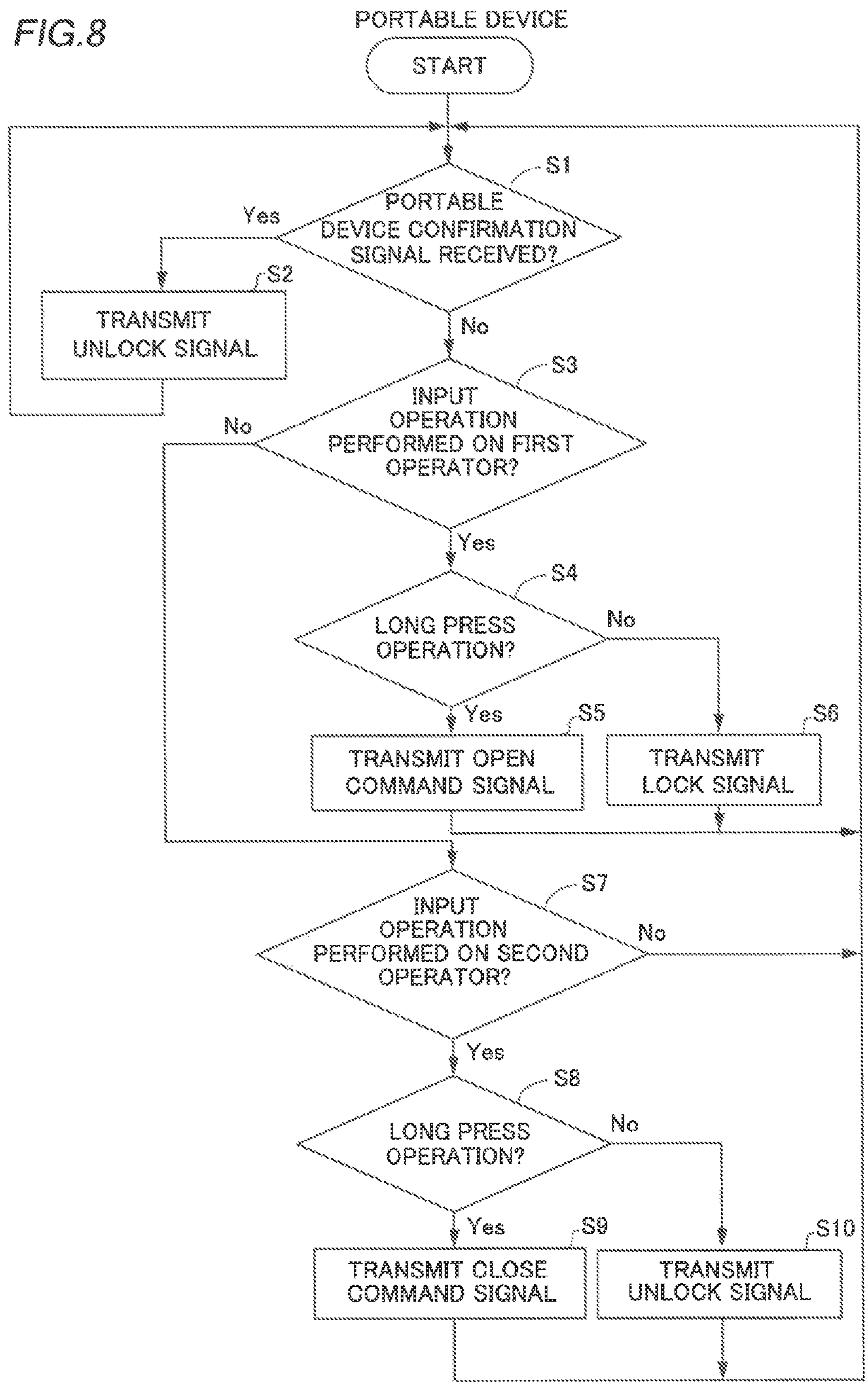
FIG.8
PORTABLE DEVICE
START
S1
PORTABLE DEVICE CONFIRMATION SIGNAL RECEIVED?
Yes
No
S2
TRANSMIT UNLOCK SIGNAL
S3
INPUT OPERATION PERFORMED ON FIRST OPERATOR?
No
Yes
S4
LONG PRESS OPERATION?
No
Yes
S5
TRANSMIT OPEN COMMAND SIGNAL
S6
TRANSMIT LOCK SIGNAL
S7
INPUT OPERATION PERFORMED ON SECOND OPERATOR?
No
Yes
S8
LONG PRESS OPERATION?
No
Yes
S9
TRANSMIT CLOSE COMMAND SIGNAL
S10
TRANSMIT UNLOCK SIGNAL RECEIVING DEVICE
(AUTOMATIC AUTHENTICATION)
START
S21
LOCK CONTROL BEING PERFORMED, BATTERY SWITCH CLOSED, AND MAIN POWER SUPPLY OPERATION SWITCH OFF?
No
Yes
S22
TRANSMIT PORTABLE DEVICE CONFIRMATION SIGNAL
S23
WIRELESS SIGNAL RECEIVED?
No
Yes
S24
AUTHENTICATION CODES MATCH EACH OTHER?
No
Yes
S25
PERFORM UNLOCK CONTROL

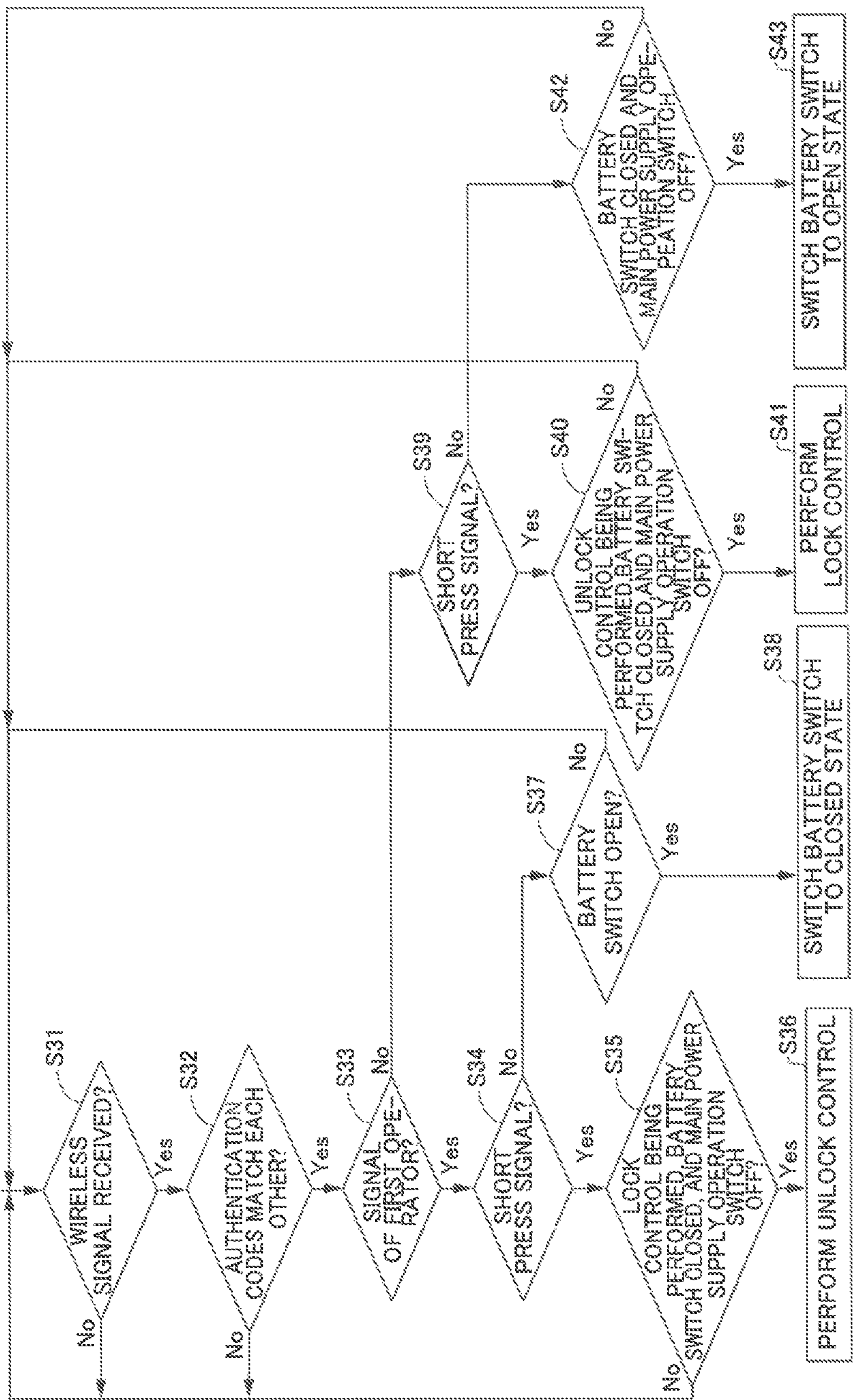
FIG. 10
RECEIVING DEVICE (RECEPTION OF SIGNAL BASED ON INPUT OPERATION ON PORTABLE DEVICE)
START
S31
WIRELESS SIGNAL RECEIVED?
S32
AUTHENTICATION CODES MATCH EACH OTHER?
S33
SIGNAL OF FIRST OPE-RATOR?
S34
SHORT PRESS SIGNAL?
S35
LOCK CONTROL BEING PERFORMED, BATTERY SWITCH CLOSED, AND MAIN POWER SUPPLY OPERATION SWITCH OFF?
S36
PERFORM UNLOCK CONTROL
S37
BATTERY SWITCH OPEN?
S38
SWITCH BATTERY SWITCH TO CLOSED STATE
S39
SHORT PRESS SIGNAL?
S40
UNLOCK CONTROL BEING PERFORMED,BATTERY SWI-TCH CLOSED,AND MAIN POWER SUPPLY OPERATION SWITCH OFF?
S41
PERFORM LOCK CONTROL
S42
BATTERY SWITCH CLOSED AND MAIN POWER SUPPLY OPE-PEATION SWITCH OFF?
S43
SWITCH BATTERY SWITCH TO OPEN STATE
Yes
No MODIFIED EXAMPLE
200
203
BMS
232
RECEI-VER
31
201
PORTABLE DEVICE
115b (115)
114
115a (115)
BATTERY
202
RECEI-VING DEVICE
4
OUT-BOARD MOTOR ECU
25
26a
26
26b
5
REMOTE CONTROL ECU
27
27a
27b
27c
27d
COMMUNICATION LINE
POWER SUPPLY/ANALOG LINE

CONTROL SYSTEM OF MARINE VESSEL AND PORTABLE DEVICE FOR MARINE VESSEL

CROSS REFERENCE TO RELATED APPLICATIONS

This application claims the benefit of priority to Japanese Patent Application No. 2019-001458 filed on Jan. 8, 2019. The entire contents of this application are hereby incorporated herein by reference.

BACKGROUND OF THE INVENTION

1. Field of the Invention

The present invention relates to a control system of a marine vessel and a portable device for a marine vessel.

2. Description of the Related Art

A control system of a marine vessel including a portable device that transmits an authentication signal, and a portable device for a marine vessel that transmits an authentication signal is known in general. Such a control system of a marine vessel is disclosed in Japanese Patent Laid-Open No. 2017-027840, for example.

Japanese Patent Laid-Open No. 2017-027840 discloses a keyless entry system for an outboard motor (hereinafter referred to as a "system") including a portable device that wirelessly transmits ID information (identification information) and a keyless controller (hereinafter referred to as a "controller"). In this system, the controller wirelessly transmits a request signal to the portable device when a marine vessel operator switches an entry switch (ENT switch) from off to on. In response to receiving the request signal, the portable device wirelessly transmits an answer signal (authentication signal) including its own ID information to the controller. The controller receives the answer signal, and when an ID in the received answer signal is a registered ID, the controller switches an engine control module (ECM) power relay switch from off to on and supplies power from a battery to the ECM. That is, in this system, an authentication control process is performed by the portable device and the controller. Thereafter, in this system, when a start/stop switch is switched from off to on by the marine vessel operator, power is supplied from the battery to a starter motor, and an engine of the outboard motor is started.

Although not disclosed in Japanese Patent Laid-Open No. 2017-027840, a conventional marine vessel generally includes a dedicated switch for a battery (hereinafter referred to as a "battery switch") in a current path between the battery and an ECM power relay switch. This battery switch is disposed in a locked battery chamber in a hull of the marine vessel. Therefore, in order to operate the battery switch, it is necessary to unlock a locked door of the battery chamber using a mechanical key and open the door. Therefore, in a control system of the conventional marine vessel, a marine vessel operator unlocks the locked door of the battery chamber using the mechanical key, opens the door, switches the battery switch from off to on, and switches the ENT switch from off to on in order to supply power from the battery to the ECM by switching the battery switch from an off state to an on state, and then performs the authentication control process.

However, in the control system of the conventional marine vessel as described above, the marine vessel operator needs to perform a plurality of (at least four) different operations on work objects in order to supply power from the battery to the ECM (engine controller). That is, in order to supply power to the ECM, the marine vessel operator needs to perform at least the operation of unlocking the locked door of the battery chamber using the mechanical key, the operation of opening the door, the operation of switching the battery switch from off to on, and the operation of switching the ENT switch (main power supply switch) from off to on. Thereafter, the authentication control process needs to be performed by a portable device and a controller. Therefore, in the control system of the conventional marine vessel, the authentication control process is performed, and the work burden on the marine vessel operator is large when power is supplied from the battery to the engine controller.

SUMMARY OF THE INVENTION

Preferred embodiments of the present invention provide control systems of marine vessels and portable devices for marine vessels that perform an authentication control process and reduce the work burden on a marine vessel operator when power is supplied from a battery to an engine controller.

A control system of a marine vessel according to a preferred embodiment of the present invention includes a portable device including a battery switch operator and that transmits an authentication signal, which is a wireless signal, and a receiving device disposed on the marine vessel and that receives the authentication signal from the portable device. The battery switch operator receives an input operation to open or close a current path between an engine controller that controls operation of an engine of the marine vessel and a battery, the portable device transmits a switch control signal, which is a wireless signal to open or close the current path, to the receiving device based on the input operation on the battery switch operator, and the control system performs an authentication control process related to control of the marine vessel based on the authentication signal from the portable device, and controls opening or closing of the current path based on the switch control signal from the portable device.

In a control system of a marine vessel according to a preferred embodiment of the present invention, the portable device, which transmits the authentication signal, transmits the switch control signal to the receiving device based on the input operation on the battery switch operator. Furthermore, the control system performs the authentication control process, and controls opening or closing of the current path between the engine controller and the battery based on the switch control signal from the portable device. Accordingly, a control to open and close the current path between the engine controller and the battery as well as the authentication control process is performed from a remote location using the wireless signal (switch control signal). Therefore, when power is supplied from the battery to the engine controller, a marine vessel operator does not need to unlock a locked door of a battery chamber using a mechanical key, to open the door, and to directly switch a battery switch from off to on. Accordingly, the work burden on the marine vessel operator is reduced when power is supplied from the battery to the engine controller while the authentication control process is performed. According to preferred embodiments of the present invention, the portable device that performs the authentication control process is used as the portable device that controls opening and closing of the current path.

Therefore, unlike the case in which the portable device that controls opening and closing of the current path and the portable device that performs the authentication control process are separate from each other, the number of portable devices does not increase, and thus the complex structure of the system is significantly reduced or prevented. Furthermore, the marine vessel operator does not need to carry a plurality of portable devices, and it is not necessary to change the plurality of portable devices depending on the application. Thus, the convenience of the marine vessel operator is improved when power is supplied from the battery to the engine controller while the authentication control process is performed.

In a control system of a marine vessel according to a preferred embodiment of the present invention, the battery switch operator preferably includes a plurality of operators separate from each other. Accordingly, a plurality of operation functions are assigned to the separate operators. Therefore, the marine vessel operator selects the operator to be operated according to the operation function intended by the marine vessel operator, and thus the operation function intended by the marine vessel operator is easily executed by the portable device. Furthermore, after the marine vessel operator operates the operator, the marine vessel operator confirms the operator that he or she has operated such that the marine vessel operator easily recognizes which operation function he or she has executed.

In the control system of a marine vessel according to a preferred embodiment of the present invention, the battery switch operator preferably includes a first operator and a second operator separate from the first operator, and the portable device preferably transmits an open command signal, which is the switch control signal to open the current path, to the receiving device based on an input operation on the first operator, and transmits a close command signal, which is the switch control signal to close the current path, to the receiving device based on an input operation on the second operator. Accordingly, an operation function to switch the current path from a closed state to an open state and an operation function to switch the current path from the open state to the closed state are assigned to the separate operators, and thus as compared with the case in which both the operation functions are assigned to one operator, the portable device easily executes the operation function intended by the marine vessel operator. Furthermore, after the marine vessel operator operates the operator, the marine vessel operator confirms whether he or she has operated the first operator or the second operator such that the marine vessel operator easily recognizes whether the operation function executed by him or her is to open the current path or to close the current path.

In a control system of a marine vessel according to a preferred embodiment of the present invention, the battery switch operator preferably receives the input operation to open or close the current path and an input operation to transmit the authentication signal, and the portable device preferably transmits the switch control signal or the authentication signal to the receiving device based on the input operation on the battery switch operator. The portable device may transmit the authentication signal only when receiving a request signal (portable device confirmation signal) from a controller. In such a case, depending on the type and structure of the marine vessel (structure modification by a user, etc.), a location in which an entry switch (main power supply switch) that serves as a trigger to transmit the request signal is disposed and an antenna that transmits the request signal are relatively distant from each other, and the portable device may not receive the request signal. On the other hand, according to preferred embodiments of the present invention, the battery switch operator receives the input operation to transmit the authentication signal, and thus the marine vessel operator performs the input operation to transmit the authentication signal on the battery switch operator in the vicinity of an antenna that transmits a request signal such that the antenna easily receives the request signal. Furthermore, the battery switch operator receives both the input operation to open or close the current path and the input operation to transmit the authentication signal. Consequently, both the input operation to open or close the current path and the input operation to transmit the authentication signal are received while an increase in the number of operators of the portable device is significantly reduced or prevented. Moreover, an increase in the size of the portable device is significantly reduced or prevented by significantly reducing or preventing an increase in the number of operators of the portable device.

In such a case, the battery switch operator preferably includes a push button, and the portable device preferably transmits the switch control signal to the receiving device when a long press operation is received in which a period during which the input operation is performed on the push button is a first period, and transmits the authentication signal to the receiving device when a short press operation is received in which a period during which the input operation is performed on the push button is a second period shorter than the first period. Accordingly, even when a single push button includes two operation functions, i.e., the operation function to transmit the switch control signal to the receiving device and the operation function to transmit the authentication signal to the receiving device, the length of a period during which the push button is pressed is changed such that the marine vessel operator is able to properly use the two different operation functions. Consequently, the convenience of the marine vessel operator using the portable device is improved while an increase in the number of operators of the portable device (an increase in the size of the portable device) is significantly reduced or prevented.

In a control system of a marine vessel including the battery switch operator including a push button, the push button preferably includes side by side a display related to authentication and a display related to opening and closing of a battery switch. Accordingly, the marine vessel operator visually recognizes the display such that the marine vessel operator easily recognizes that the battery switch operator including the display receives both the input operation to open or close the current path and the input operation to transmit the authentication signal.

In a control system of a marine vessel including the battery switch operator that receives both the input operation to open or close the current path and the input operation to transmit the authentication signal, the battery switch operator preferably includes a first operator and a second operator separate from the first operator, and the portable device preferably transmits an open command signal, which is the switch control signal to open the current path, to the receiving device based on an input operation on the first operator, transmits a lock signal to perform a lock control to lock at least a portion of the marine vessel as the authentication signal to the receiving device based on another input operation on the first operator, transmits a close command signal, which is the switch control signal to close the current path, to the receiving device based on an input operation on the second operator, and transmits an unlock signal to perform an unlock control to unlock the lock control as the authentication signal to the receiving device based on another input operation on the second operator. Accordingly, an operator through which the open command signal and the lock signal are transmitted when power supply from the battery to the engine controller is stopped is assigned to the first operator, and an operator through which the close command signal and the unlock signal are transmitted when power supply from the battery to the engine controller is started is assigned to the second operator. Consequently, the marine vessel operator uses only the second operator when starting the operation of the marine vessel, and uses only the first operator when terminating the operation of the marine vessel, and thus the battery switch operator is prevented from receiving an input operation different from the intention of the marine vessel operator.

In a control system of a marine vessel including the battery switch operator including the first operator and the second operator, the portable device preferably includes a portable device case in which the battery switch operator is disposed, and the portable device case preferably includes the first operator and the second operator adjacent to each other along a longitudinal direction of the portable device case. Accordingly, the first operator and the second operator are disposed adjacent to each other such that the marine vessel operator easily operates the first operator and the second operator separately. Furthermore, the first operator and the second operator are provided adjacent to each other along the longitudinal direction such that as compared with the case in which the first operator and the second operator are provided adjacent to each other along the short-side direction, the length of the portable device in the direction (longitudinal direction) in which the first operator and the second operator are adjacent to each other is increased.

In a control system of a marine vessel according to a preferred embodiment of the present invention, the portable device preferably includes a portable device case inside which the battery switch operator is disposed, a transmitter that transmits the wireless signal to the receiving device preferably disposed inside the portable device case, and the portable device case is preferably sealed by a seal. Accordingly, for example, even when the portable device is placed in water, water is prevented from entering the transmitter inside the portable device case.

In such a case, the portable device case is preferably sealed such that an internal space thereof is covered, and the portable device preferably floats on a water surface due to a buoyancy force generated due to the internal space of the portable device case that has been sealed when the portable device is placed in water. Accordingly, for example, even when the portable device is placed in water, the portable device that has floated on the water surface is easily found and retrieved as compared with the case in which the portable device case is submerged in water. Consequently, the portable device for a marine vessel is prevented from being lost.

A control system of a marine vessel according to a preferred embodiment of the present invention preferably further includes a controller configured or programmed to perform the authentication control process based on the authentication signal, and perform a control to open or close the current path by controlling opening or closing of a battery switch disposed in the current path based on the switch control signal. Accordingly, one controller performs both the authentication control process and the process of controlling opening and closing of the battery switch, and thus an increase in the number of controllers is significantly reduced or prevented as compared with the case in which separate controllers respectively perform the authentication control process and the process of controlling opening and closing of the battery switch.

In such a case, the receiving device preferably defines and functions as the controller. Accordingly, it is not necessary to provide a controller separately from the receiving device, and thus the wireless signal is received, the authentication control process is performed, and the process of controlling opening and closing of the battery switch is performed while the complex structure of the control system of a marine vessel is significantly reduced or prevented.

A control system of a marine vessel including the controller that performs both the authentication control process and the process of controlling opening and closing of the battery switch preferably further includes a main power supply switch disposed in a current path between the battery switch and the engine controller. Accordingly, when the battery switch is operated with the portable device and power is supplied to the engine controller, the main power supply switch is operated, and thus power is supplied to the engine controller in a state in which the marine vessel operator boards the marine vessel in which the main power supply switch is disposed.

In such a case, the controller preferably transmits a portable device confirmation signal when the battery switch is closed and the main power supply switch is off, and the portable device preferably includes a portable device receiver that receives the portable device confirmation signal, and transmits the authentication signal based on the portable device confirmation signal to the receiving device. Accordingly, the authentication signal is automatically transmitted to the receiving device in response to the portable device confirmation signal when the main power supply switch is off, and thus an increase in the number of times the marine vessel operator operates the portable device until power is supplied from the battery to the engine controller is significantly reduced or prevented.

In a control system of a marine vessel according to a preferred embodiment of the present invention, the receiving device is preferably continuously connected to the battery. Accordingly, it is not necessary to prepare a battery for the receiving device separately from the battery for the marine vessel, and thus the complexity of the control system for the marine vessel is significantly reduced or prevented.

A portable device for a marine vessel according to a preferred embodiment of the present invention includes a battery switch operator, and a transmitter that transmits an authentication signal that is a wireless signal that performs authentication. The battery switch operator receives an input operation to open or close a current path between an engine controller that controls operation of an engine of the marine vessel and a battery, and the transmitter transmits a switch control signal, which is a wireless signal to open or close the current path, based on the input operation on the battery switch operator.

In a portable device for a marine vessel according to a preferred embodiment of the present invention, the work burden on a marine vessel operator is reduced when power is supplied from the battery to the engine controller while the authentication control process is performed.

In a portable device for a marine vessel according to a preferred embodiment of the present invention, the battery switch operator preferably includes a first operator and a second operator separate from the first operator, and the transmitter preferably transmits an open command signal, which is the switch control signal to open the current path, based on an input operation on the first operator, and transmits a close command signal, which is the switch control signal to close the current path, based on an input operation on the second operator. Accordingly, an operation function to switch the current path from a closed state to an open state and an operation function to switch the current path from the open state to the closed state are assigned to the separate operators, and thus as compared with the case in which both the operation functions are assigned to one operator, the portable device easily executes the operation function intended by the marine vessel operator. Furthermore, after the marine vessel operator operates the operator, the marine vessel operator confirms whether he or she has operated the first operator or the second operator such that the marine vessel operator easily recognizes whether the operation function executed by him or her is to open the current path or to close the current path.

In a portable device for a marine vessel according to a preferred embodiment of the present invention, the battery switch operator preferably receives the input operation to open or close the current path and an input operation to transmit the authentication signal, and the transmitter preferably transmits the switch control signal or the authentication signal based on the input operation on the battery switch operator. Accordingly, both the input operation to open or close the current path and the input operation to transmit the authentication signal are received while an increase in the number of operators of the portable device is significantly reduced or prevented. Moreover, an increase in the size of the portable device is significantly reduced or prevented by significantly reducing or preventing an increase in the number of operators of the portable device.

In such a case, the battery switch operator preferably includes a push button, and the transmitter preferably transmits the switch control signal when a long press operation is received in which a period during which the input operation is performed on the push button is a first period, and transmits the authentication signal when a short press operation is received in which a period during which the input operation is performed on the push button is a second period shorter than the first period. Accordingly, even when a single push button includes two operation functions, the length of a period during which the push button is pressed is changed such that the marine vessel operator is able to properly use the two different operation functions. Consequently, the convenience of the marine vessel operator using the portable device is improved while an increase in the number of operators of the portable device (an increase in the size of the portable device) is significantly reduced or prevented.

In a portable device for a marine vessel including the battery switch operator that receives both the input operation to open or close the current path and the input operation to transmit the authentication signal, the battery switch operator preferably includes a first operator and a second operator separate from the first operator, and the transmitter preferably transmits an open command signal, which is the switch control signal to open the current path, based on an input operation on the first operator, transmits a lock signal to perform a lock control to lock at least a portion of the marine vessel as the authentication signal based on another input operation on the first operator, transmits a close command signal, which is the switch control signal to close the current path, based on an input operation on the second operator, and transmits an unlock signal to perform an unlock control to unlock the lock control as the authentication signal based on another input operation on the second operator. Accordingly, an operator through which the open command signal and the lock signal are transmitted when power supply from the battery to the engine controller is stopped is assigned to the first operator, and an operator through which the close command signal and the unlock signal are transmitted when power supply from the battery to the engine controller is started is assigned to the second operator. Consequently, the marine vessel operator uses only the second operator when starting the operation of the marine vessel, and uses only the first operator when terminating the operation of the marine vessel, and thus the battery switch operator is prevented from receiving an input operation different from the intention of the marine vessel operator.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a diagram (flowchart) illustrating a control process of a portable device according to a preferred embodiment of the present invention.

FIG. 10 is a diagram (flowchart) illustrating a control process (receiving a signal based on an input operation on a portable device) of a receiving device according to a preferred embodiment of the present invention.

DETAILED DESCRIPTION OF THE PREFERRED EMBODIMENTS

Preferred embodiments of the present invention are hereinafter described with reference to the drawings.

The structure of a control system 100 (hereinafter referred to as a "system 100") of a marine vessel 110 according to preferred embodiments of the present invention is now described with reference to FIGS. 1 to 7.

Figure 1:
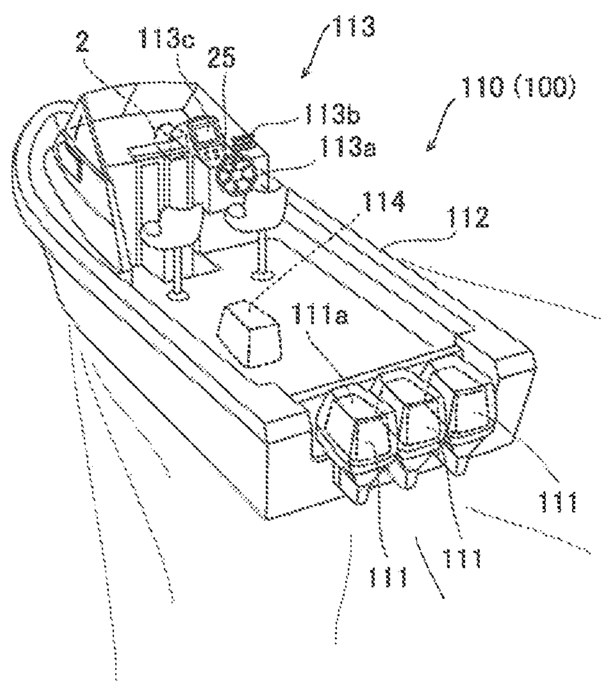
FIG. 1 is a perspective view showing the overall structure of a marine vessel according to a preferred embodiment of the present invention.

The system 100 according to preferred embodiments of the present invention controls the marine vessel 110 shown in FIG. 1. The marine vessel 110 is a small marine vessel, for example. The marine vessel 110 is an outboard motor boat including outboard motors 111. For example, the marine vessel 110 includes a plurality of (three, for example) outboard motors 111.

The marine vessel 110 includes a hull 112, a marine vessel operation unit 113, and a battery 114. The outboard motors 111 are attached to a rear portion of the hull 112. The marine vessel operation unit 113 includes a steering wheel 113*a* and three remote controls 113*b* through which a marine vessel operator operates the outboard motors 111 while being located on an operation seat (cockpit), and an indicator 113*c* that indicates the rotational speeds of engines 111*a* of the outboard motors 111. In other words, the marine vessel operation unit 113 is a console. In FIG. 1, the marine vessel operator is not shown.

Figure 2:
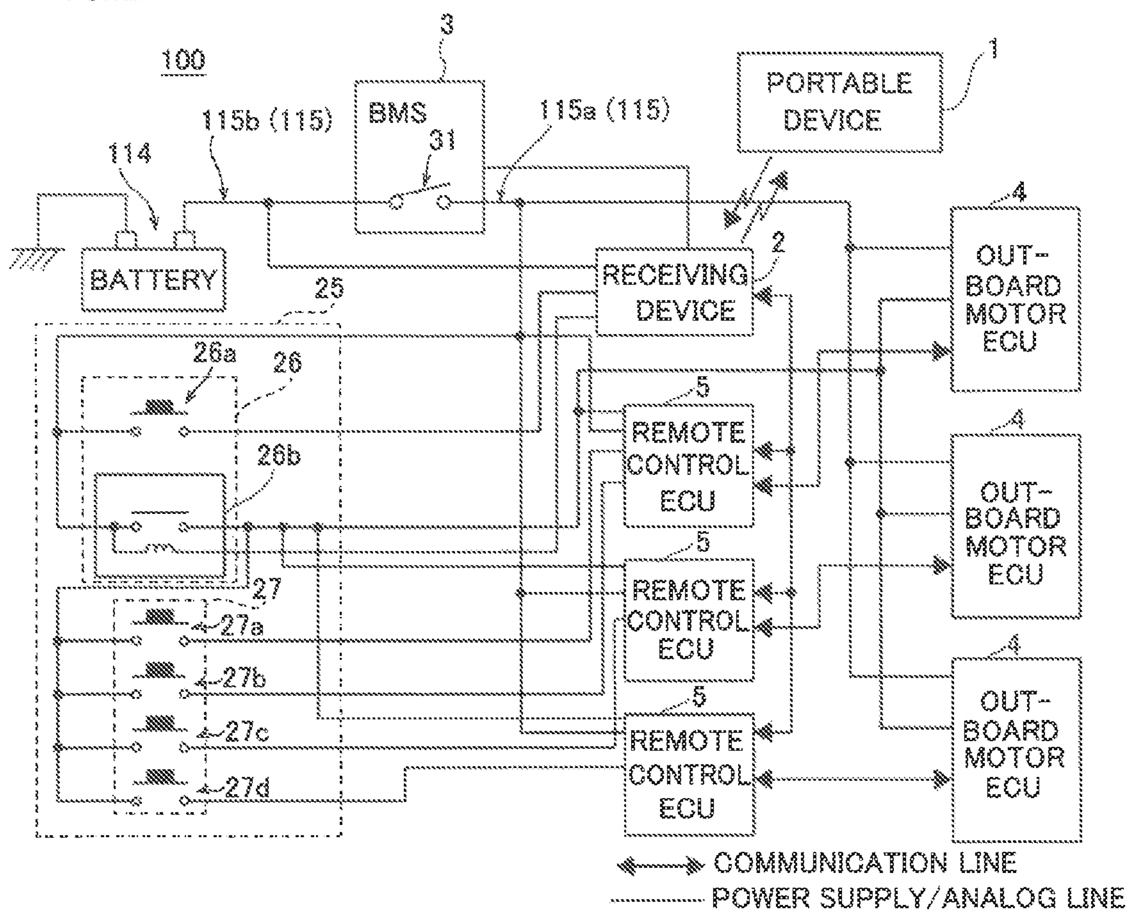
FIG. 2 is a block diagram showing the structure of a control system of a marine vessel according to a preferred embodiment of the present invention.

As shown in FIG. 2, the system 100 includes a portable device 1 and a receiving device 2. The portable device 1 transmits an authentication signal SA, which is a wireless signal (encrypted signal) that performs authentication. The receiving device 2 is disposed on the marine vessel 110, receives the authentication signal SA from the portable device 1, and performs an authentication control process related to control of the marine vessel 110 based on the received authentication signal SA. That is, the system 100 is an authentication control system (antitheft system) that performs the authentication control process related to control of the marine vessel 110 due to wireless communication between the portable device 1 and the receiving device 2. The system 100 is a so-called keyless entry system or smart key system that does not include a mechanical key.

The system 100 includes a battery management system 3 (hereinafter referred to as a "BMS3"), outboard motor engine control units 4 (hereinafter referred to as "outboard motor ECUs 4"), and remote control engine control units 5 (hereinafter referred to as "remote control ECUs 5"). The outboard motor ECUs 4 and the remote control ECUs 5 are examples of an "engine controller".

The BMS 3 is disposed in a current path 115 between both the outboard motor ECUs 4 and the remote control ECUs 5 and the battery 114, and includes a battery switch 31 that switches between a state in which both the outboard motor ECUs 4 and the remote control ECUs 5 are electrically connected to the battery 114 (on: a closed state) and a state in which both the outboard motor ECUs 4 and the remote control ECUs 5 are electrically disconnected from the battery 114 (off: an open state). In other words, the battery switch 31 is a dedicated switch for the battery 114, and is directly connected to the battery 114. Furthermore, the battery switch 31 is disposed upstream (battery 114 side) of a main power supply operation unit 26 and a start/stop operation unit 27 (described below). Opening or closing the battery switch 31 is an example of "opening or closing a current path".

Specifically, the battery switch 31 connects a current path 115*a* between both the outboard motor ECUs 4 and the remote control ECUs 5 and the battery switch 31 to a current path 115*b* between the battery 114 and the battery switch 31 in the closed state, and disconnects the current path 115*a* from the current path 115*b* in the open state. Furthermore, another switch, for example, is not provided in the current path 115*b*. When the marine vessel 110 includes a plurality of batteries 114, the BMS 3 includes a plurality of battery switches 31. The current path 115*a* is connected to a lamp (not shown), for example, provided in the marine vessel 110, and the battery switch 31 is closed to supply power to the lamp, for example.

The battery switch 31 is connected to the receiving device 2. The battery switch 31 switches between the open state and the closed state based on a command (analog signal) from the receiving device 2.

The outboard motor ECUs 4 control the engines 111*a* (see FIG. 1) of the outboard motors 111. The outboard motor ECUs 4 are respectively disposed in the outboard motors 111. The outboard motor ECUs 4 are connected to the receiving device 2 via the remote control ECUs 5. The outboard motor ECUs 4 perform a control to permit starting of the engines 111*a* when an unlock control described below is performed, and perform a control to prohibit starting of the engines 111*a* when a lock control described below is performed. For example, the receiving device 2 is connected to the remote control ECUs 5 by controller area network (CAN) communication lines. The outboard motor ECUs 4 are connected to the remote control ECUs 5 by CAN communication lines. The CAN communication lines that connect the receiving device 2 to the remote control ECUs 5 are provided separately from the CAN communication lines that connect the outboard motor ECUs 4 to the remote control ECUs 5.

The remote control ECUs 5 are provided in the remote controls 113*b* (see FIG. 1). The remote control ECUs 5 control the engines 111*a* via the outboard motor ECUs 4 based on operations from the remote controls 113*b*. For example, the remote control ECUs 5 are respectively provided in the remote controls 113*b*. In an example of FIG. 2, the system 100 includes three remote control ECUs 5. Each of the three remote control ECUs 5 is connected to the corresponding outboard motor ECU 4 and the receiving device 2 by communication lines such that CAN communication therebetween is possible.

Figure 3:
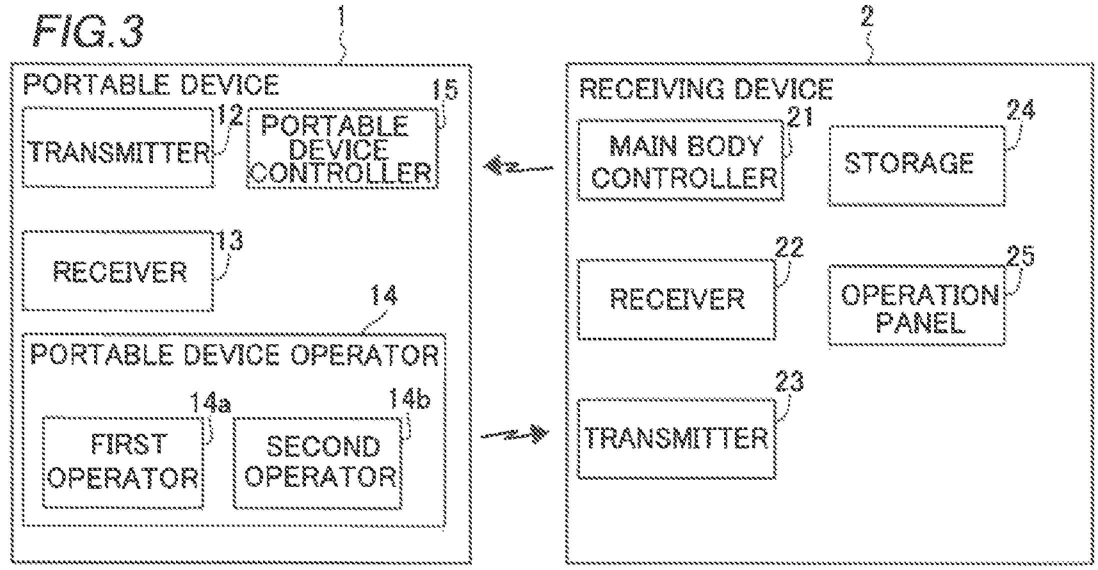
FIG. 3 is a block diagram showing the structure of a portable device and a receiving device according to a preferred embodiment of the present invention.
Figure 4:
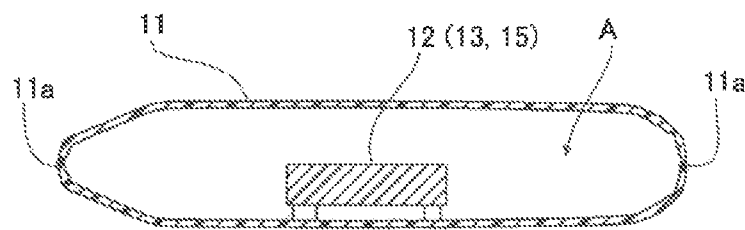
FIG. 4 is a sectional view of a portable device according to a preferred embodiment of the present invention.
Figure 5:
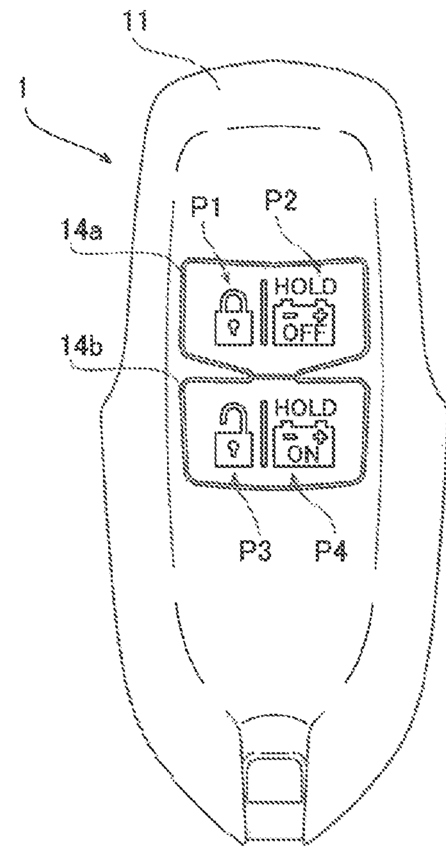
FIG. 5 is a plan view of a portable device according to a preferred embodiment of the present invention.

As shown in FIGS. 3 to 5, the portable device 1 includes a portable device case 11, a transmitter 12, a receiver 13, a portable device operator 14, and a portable device controller 15. The portable device case 11 is sealed (is liquid-tight) by the seal 11*a* such that the seal 11*a* covers an internal space A. When the portable device case 11 is placed in water, the portable device 1 floats on the water surface due to a buoyancy force generated due to the internal space A (air). As shown in FIG. 4, the transmitter 12, the receiver 13, and the portable device controller 15 are disposed inside the portable device case 11. As shown in FIG. 5, the portable device case 11 is substantially oval or substantially rectangular in a plan view, and the marine vessel operator is able to grip the portable device case 11. The receiver 13 is an example of a "portable device receiver". The portable device operator 14 is an example of a "battery switch operator".

The transmitter 12 includes a communication antenna that transmits an ultra-high frequency (UHF) wireless signal, for example. The transmitter 12 transmits the authentication signal SA, which is a wireless signal including an authentication code C (ID information, for example) that differs for each portable device 1, to the receiving device 2. The receiver 13 includes a communication antenna that receives an ultra-high frequency wireless signal, for example. The transmitter 12 and the receiver 13 transmit and receive wireless signals within a radius of several tens of meters, for example. Note that the range of transmission and reception is not limited to a radius of several tens of meters, but the range of transmission and reception may be a radius of several meters or a radius of about 1 m, for example, corresponding to the dimensions of the marine vessel 110 and/or a situation in which the authentication control process is used. The transmitter 12 and the receiver 13 may transmit and receive wireless signals (longwave signals, for example) at other wavelength regions instead of the ultra-high frequency wireless signals.

As shown in FIG. 5, the portable device operator 14 includes a first operator 14*a* and a second operator 14*b* provided separately from each other. Each of the first operator 14*a* and the second operator 14*b* includes a push button switch provided on the portable device case 11, and receives a pressing force by the marine vessel operator as an input operation. The first operator 14*a* and the second operator 14*b* are disposed adjacent to each other in the longitudinal direction of the portable device case 11.

According to a preferred embodiment, the portable device operator 14 receives an input operation (long press operation described below) to open or close the battery switch 31. Furthermore, the portable device operator 14 receives an input operation (short press operation described below) to transmit the authentication signal SA (a lock signal SL or an unlock signal SU) to the receiving device 2.

According to a preferred embodiment, the first operator 14*a* includes a diagram (P1) indicating a locking display related to authentication and a diagram (P2) indicating that the battery switch 31 is in the open state (the characters "OFF") as a display related to opening and closing of the battery switch side by side in the short-side direction of the portable device case 11. The second operator 14*b* includes a diagram (P3) indicating an unlocking display related to authentication and a diagram (P4) indicating that the battery switch 31 is in the closed state (characters of "ON") as a display related to opening and closing of the battery switch side by side in the short-side direction of the portable device case 11.

The portable device controller 15 includes a control circuit. The portable device controller 15 performs a control to transmit a wireless signal based on an input operation on the portable device operator 14 from the transmitter 12 to the receiving device 2. Specifically, the portable device controller 15 transmits a switch control signal SS, which is a wireless signal to open or close the battery switch 31, to the receiving device 2 based on an input operation on the portable device operator 14.

Figure 6:
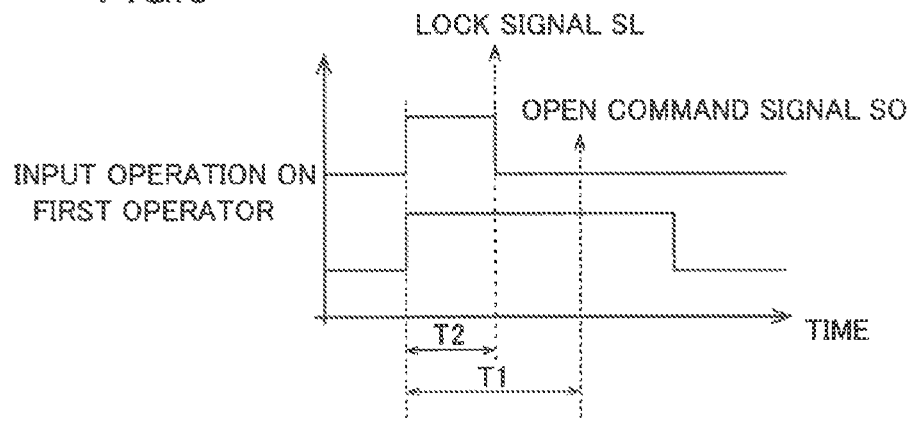
FIG. 6 is a diagram illustrating an input operation on a first operator according to a preferred embodiment of the present invention.
Figure 7:
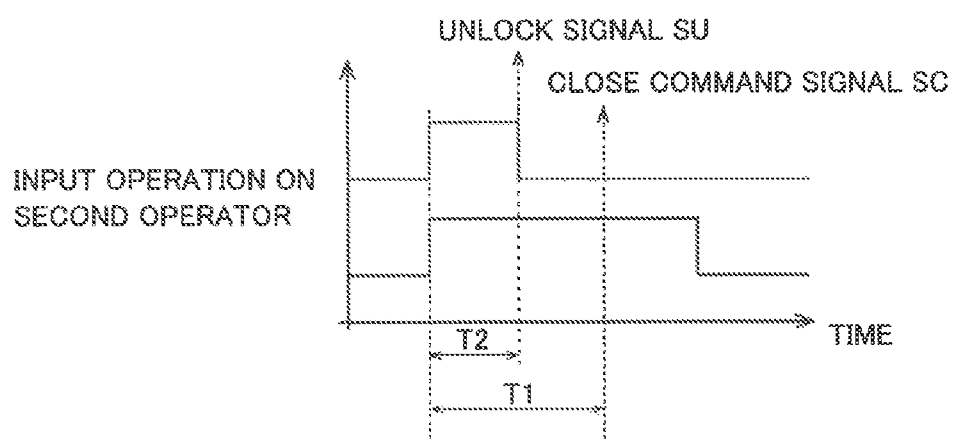
FIG. 7 is a diagram illustrating an input operation on a second operator according to a preferred embodiment of the present invention.

More specifically, as shown in FIGS. 6 and 7, the portable device controller 15 transmits the switch control signal SS to the receiving device 2 when a long press operation is received in which a period during which an input operation is performed on the portable device operator 14 is a period T1. The portable device controller 15 transmits the authentication signal SA to the receiving device 2 when a short press operation is received in which a period during which an input operation is performed on the portable device operator 14 is a period T2 shorter than the period T1. The switch control signal SS includes an authentication code C. For example, the period T1 is 1 second, and the period T2 is less than 1 second. The period T1 is an example of a "first period". The period T2 is an example of a "second period".

Specifically, the portable device controller 15 transmits the switch control signal SS to the receiving device 2 when the period during which an input operation is performed on the portable device operator 14 is the period T1 (in the case of a long press operation). The portable device controller 15 performs a control to transmit the lock signal SL or the unlock signal SU to the receiving device 2 when the period during which an input operation is performed is the period T2 shorter than the period T1 (in the case of a short press operation).

The portable device controller 15 transmits an open command signal SO, which is a switch control signal SS to open the battery switch 31, to the receiving device 2 based on a long press operation on the first operator 14*a*. In addition, the portable device controller 15 transmits a close command signal SC, which is a switch control signal SS to close the battery switch 31, to the receiving device 2 based on a long press operation on the second operator 14*b*.

The portable device controller 15 transmits, to the receiving device 2, the lock signal SL to perform a lock control to lock at least a portion of the marine vessel 110 as an authentication signal SA based on a short press operation on the first operator 14*a*. In addition, the portable device controller 15 transmits, to the receiving device 2, the unlock signal SU to perform an unlock control to unlock the lock control as an authentication signal SA based on a short press operation on the second operator 14*b*.

As shown in FIG. 2, the receiving device 2 performs the authentication control process based on the authentication signal SA, and performs a control to open or close the current path 115 (battery switch 31) by performing a control to open or close the battery switch 31 disposed in the current path 115 based on the switch control signal SS. That is, the receiving device 2 includes an immobilizer that performs the authentication control process, and includes a battery switch controller that controls opening and closing of the battery switch 31.

According to a preferred embodiment, the receiving device 2 is continuously connected to the battery 114. In other words, the receiving device 2 is directly connected to the battery 114 by the current path 115*b*. Thus, the receiving device 2 is operable even when the battery switch 31 is in the open state.

As shown in FIG. 3, the receiving device 2 includes a main body controller 21, a receiver 22, a transmitter 23, a storage 24, and an operation panel 25. As shown in FIG. 1, the receiving device 2 (the main body controller 21, the receiver 22, the transmitter 23, and the storage 24) is disposed inside the marine vessel operation unit 113 (console) of the marine vessel 110. The operation panel 25 is disposed on the marine vessel operation unit 113. Accordingly, the operation panel 25 is operable by the marine vessel operator who operates the marine vessel operation unit 113.

The receiver 22 includes a communication antenna that receives an ultra-high frequency (UHF) wireless signal, for example, and receives the wireless signal from the portable device 1. Specifically, the receiver 22 receives the switch control signal SS and the authentication signal SA including the authentication code C from the portable device 1. The transmitter 23 includes a communication antenna that transmits an ultra-high frequency (UHF) wireless signal, for example, and transmits, to the portable device 1, a portable device confirmation signal SB (request signal) to request the unlock signal SU. The storage 24 stores a verification authentication code C, a control program, etc. Note that the receiver 22 and the transmitter 23 may transmit and receive wireless signals (longwave signals, for example) at other wavelength regions instead of the ultra-high frequency wireless signals.

As shown in FIG. 2, the operation panel 25 includes the main power supply operation unit 26 and the start/stop operation unit 27. The main power supply operation unit 26 includes a main power supply operation switch 26*a* and a main power supply relay 26*b*. The start/stop operation unit 27 includes an all-device start/stop switch 27*a*, a first start/stop switch 27*b*, a second start/stop switch 27*c*, and a third start/stop switch 27*d*. The main power supply operation unit 26 is an example of a "main power supply switch".

The main power supply operation switch 26*a* is disposed between the battery switch 31 and the receiving device 2. Thus, the receiving device 2 detects that the main power supply operation switch 26*a* has been operated. That is, when the main power supply operation switch 26*a* is closed by the marine vessel operator, an analog signal is input to the receiving device 2. A contact of the main power supply relay 26*b* is disposed between the battery switch 31 and both the outboard motor ECUs 4 and the remote control ECUs 5. A coil of the main power supply relay 26*b* is disposed between the battery switch 31 and the receiving device 2.

The start/stop operation unit 27 is connected to the downstream side (the side opposite to the battery 114) of the main power supply relay 26*b*. The all-device start/stop switch 27*a* is connected to at least one of the three remote control ECUs 5. The first start/stop switch 27*b*, the second start/stop switch 27*c*, and the third start/stop switch 27*d* are each connected to the corresponding remote control ECU 5. Thus, when the battery switch 31 is closed and the main power supply relay 26*b* is closed, an analog signal (a voltage from the battery 114) is input to each of the remote control ECUs 5 based on an operation on the start/stop operation unit 27.

When one of the remote control ECUs 5 acquires an analog signal due to an operation on the all-device start/stop switch 27*a*, the remote control ECU 5 instructs the outboard motor ECUs 4 to perform a control to start the engines 111*a* via all other remote control ECUs 5. Furthermore, when one of the remote control ECUs 5 acquires an analog signal due to an operation on any one of the first start/stop switch 27*b*, the second start/stop switch 27*c*, and the third start/stop switch 27*d*, an outboard motor ECU 4 corresponding to the remote control ECU 5 that has acquired the analog signal is instructed to perform a control to start a corresponding engine 111*a*. The outboard motor ECUs 4 supply power from the battery 114 to starter motors in the outboard motors 111 in accordance with commands from the remote control ECUs 5 to start the engines 111*a*. Information regarding input operations on the main power supply operation unit 26 and the start/stop operation unit 27 is shared by all the outboard motor ECUs 4 and all the remote control ECUs 5 by CAN communication.

The main body controller 21 includes a control circuit. As the authentication control process, the main body controller 21 verifies the authentication codes C of the switch control signal SS and the authentication signal SA received from the portable device 1 and the verification authentication code C stored in advance in the storage 24. When the authentication code C received from the portable device 1 corresponds to (matches) the authentication code C stored in the storage 24, the main body controller 21 performs a control process based on each signal.

Specifically, the main body controller 21 transmits a control signal (analog signal) to the BMS 3 based on receiving the switch control signal SS (the signal based on the long press operation) to switch between opening and closing of the battery switch 31. For example, the main body controller 21 performs a control to switch the battery switch 31 from the closed state to the open state when acquiring the open command signal SO of the switch control signal SS. Furthermore, the main body controller 21 performs a control to switch the battery switch 31 from the open state to the closed state when acquiring the close command signal SC of the switch control signal SS.

The main body controller 21 performs a lock control based on receiving the lock signal SL (the signal based on the short press operation). Furthermore, the main body controller 21 performs an unlock control based on receiving the unlock signal SU (the signal based on the short press operation). The main body controller 21 opens the main power supply relay 26*b* as the lock control. The main body controller 21 closes the main power supply relay 26*b* as the unlock control. Accordingly, even when an operation is performed on the start/stop operation unit 27 during the lock control, the engines 111*a* are not started (starting is not permitted) by the remote control ECUs 5 and the outboard motor ECUs 4. When an operation is performed on the start/stop operation unit 27 during the unlock control, an analog signal (a voltage from the battery 114) is transmitted to at least one of the remote control ECUs 5 and at least one of the outboard motor ECUs 4 (starting is permitted).

According to a preferred embodiment, the receiving device 2 transmits the portable device confirmation signal SB when the lock control is being performed, the battery switch 31 is closed, and the main power supply operation switch 26*a* is off. The receiver 13 of the portable device 1 receives the portable device confirmation signal SB. In response to receiving the portable device confirmation signal SB, the portable device controller 15 transmits the unlock signal SU (answer signal) including the authentication signal SA, which is a calculation result obtained by adding the authentication code C (ID information), to the receiving device 2. That is, the system 100 automatically performs the authentication control process when the battery switch 31 is closed and the main power supply operation switch 26*a* is off, separately from the authentication control process in response to an operation on the portable device 1.

A control process performed by the system 100 according to preferred embodiments of the present invention is now described with reference to FIGS. 8 and 9. A control process of the portable device 1 is performed by the portable device controller 15, and a control process of the receiving device 2 is performed by the main body controller 21.

As shown in FIG. 8, in step S1, it is determined whether or not the portable device confirmation signal SB has been received. When the portable device confirmation signal SB has been received, the process advances to step S2, and when the portable device confirmation signal SB has not been received, the process advances to step S3. In step S2, the unlock signal SU is transmitted from the portable device 1 to the receiving device 2. After step S2, the process returns to step S1.

In step S3, it is determined whether or not an input operation has been performed on the first operator 14*a* (the first operator 14*a* has been pressed). When an input operation has been performed on the first operator 14*a*, the process advances to step S4, and when an input operation has not been performed on the first operator 14*a*, the process advances to step S7.

In step S4, it is determined whether or not the input operation is a long press operation (whether or not the input operation is a short press operation). When the input operation is a long press operation, the process advances to step S5, and when the input operation is a short press operation, the process advances to step S6. In step S5, the open command signal SO is transmitted from the portable device 1 to the receiving device 2. In step S6, the lock signal SL is transmitted from the portable device 1 to the receiving device 2. After step S5 or step S6, the process returns to step S1.

In step S7, the portable device 1 determines whether or not an input operation has been performed on the second operator 14*b* (the second operator 14*b* has been pressed). When an input operation has been performed on the second operator 14*b*, the process advances to step S8, and when an input operation has not been performed on the second operator 14*b*, the process returns to step S1.

In step S8, it is determined whether the input operation is a long press operation or a short press operation. When the input operation is a long press operation, the process advances to step S9, and when the input operation is a short press operation, the process advances to step S10. In step S9, the close command signal SC is transmitted from the portable device 1 to the receiving device 2. In step S10, the unlock signal SU is transmitted from the portable device 1 to the receiving device 2. After step S9 or step S10, the process returns to step S1.

Figure 9:
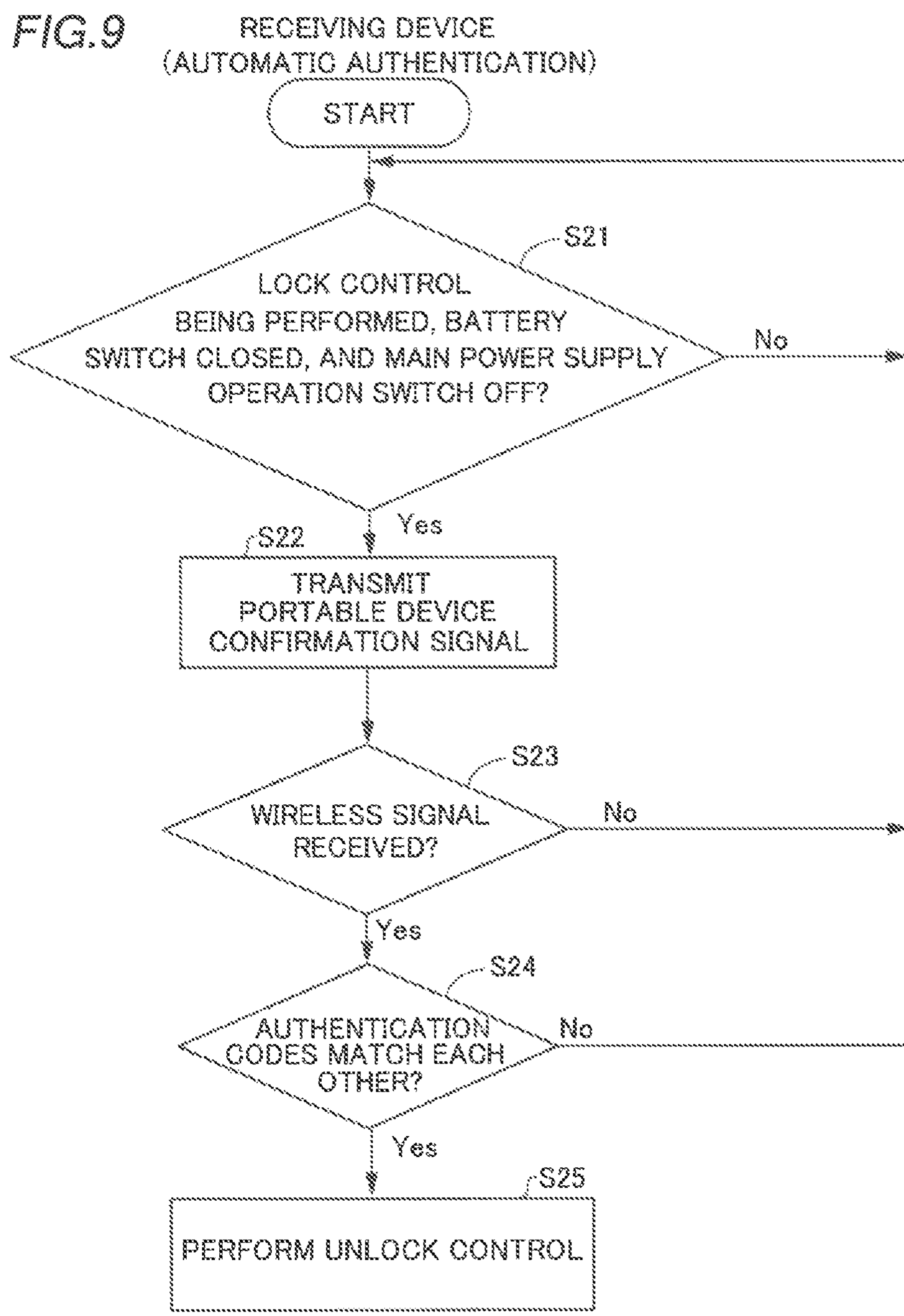
FIG. 9 is a diagram (flowchart) illustrating a control process (automatic authentication) of a receiving device according to a preferred embodiment of the present invention.

As shown in FIG. 9, in step S21, it is determined whether or not a lock control is being performed, the battery switch 31 is closed, and the main power supply operation switch 26*a* is off. When the battery switch 31 is closed and the main power supply operation switch 26*a* is off, the process advances to step S22. When the battery switch 31 is open or the main power supply operation switch 26*a* is on, step S21 is repeated. In step S22, the portable device confirmation signal SB is transmitted from the receiving device 2 to the portable device 1. Thereafter, the process advances to step S23.

In step S23, it is determined whether or not the wireless signal (the switch control signal SS or the authentication signal SA) has been received from the portable device 1. When the wireless signal has been received, the process proceeds to step S24, and when the wireless signal has not been received, the process returns to step S21.

In step S24, the authentication code C of the received wireless signal and the verification authentication code C stored in the storage 24 are verified. When the received authentication code C matches the verification authentication code C, the process advances to step S25, and when the received authentication code C does not match the verification authentication code C, the process returns to step S21.

In step S25, an unlock control is performed. Through the above process, automatic authentication process is performed by the receiving device 2.

As shown in FIG. 10, in step S31, it is determined whether or not the wireless signal has been received from the portable device 1. When the wireless signal has been received, the process proceeds to step S32, and when the wireless signal has not been received, step S31 is repeated.

In step S32, the authentication code C of the received wireless signal and the verification authentication code C stored in the storage 24 are verified. When the received authentication code C matches the verification authentication code C, the process advances to step S33, and when the received authentication code C does not match the verification authentication code C, the process returns to step S31.

In step S33, it is determined whether or not the received wireless signal is a signal based on an input operation on the first operator 14*a* (hereinafter referred to as a "signal of the first operator 14*a*"). When the received wireless signal is the signal of the first operator 14*a*, the process advances to step S34, and when the received wireless signal is not the signal of the first operator 14*a* (when the received wireless signal is a signal based on an input operation on the second operator 14*b*), the process advances to step S39.

In step S34, it is determined whether or not the received wireless signal is a short press signal (either the close command signal SC or the unlock signal SU). When the received wireless signal is a short press signal (unlock signal SU), the process advances to step S35, and when the received wireless signal is not a short press signal (long press signal: close command signal SC), the process advances to step S37.

In step S35, it is determined whether or not lock a control is being performed, the battery switch 31 is closed, and the main power supply operation switch 26*a* is off. When the lock control is being performed, the battery switch 31 is closed, and the main power supply operation switch 26*a* is off, the process advances to step S36, and when the lock control is not being performed, the battery switch 31 is not closed, or the main power supply operation switch 26*a* is not off, the process returns to step S31. In step S36, an unlock control is performed.

In step S37, it is determined whether or not the battery switch 31 is open. When the battery switch 31 is open, the process advances to step S38, and when the battery switch 31 is not open, the process returns to step S31. In step S38, the battery switch 31 is switched to the closed state.

In step S39, it is determined whether or not the received wireless signal is a short press signal (either the open command signal SO or the lock signal SL). When the received wireless signal is a short press signal (lock signal SL), the process advances to step S40, and when the received wireless signal is not a short press signal (long press signal: open command signal SO), the process advances to step S42.

In step S40, it is determined whether or not the unlock control is being performed, the battery switch 31 is closed, and the main power supply operation switch 26*a* is off. When the unlock control is being performed, the battery switch 31 is closed, and the main power supply operation switch 26*a* is off, the process advances to step S41, and when the unlock control is not being performed, the battery switch 31 is not closed, or the main power supply operation switch 26*a* is not off, the process returns to step S31. In step S41, the lock control is performed.

In step S42, it is determined whether or not the battery switch 31 is closed and the main power supply operation switch 26*a* is off. When the battery switch 31 is closed and the main power supply operation switch 26*a* is off, the process advances to step S43, and when the battery switch 31 is open or the main power supply operation switch 26*a* is on, the process returns to step S31. In step S43, the battery switch 31 is switched to the open state. Through the above process, the process related to reception of a signal based on an input operation on the portable device 1 is performed.

According to the various preferred embodiments of the present invention described above, the following advantageous effects are achieved.

According to a preferred embodiment of the present invention, the portable device 1 that transmits the authentication signal SA transmits the switch control signal SS to the receiving device 2 based on the input operation on the portable device operator 14. Furthermore, the system 100 performs the authentication control process, and controls opening or closing of the current path 115 between both the outboard motor ECUs 4 and the remote control ECUs 5 and the battery 114 based on the switch control signal SS from the portable device 1. Accordingly, a control of opening and closing of the current path 115 between both the outboard motor ECUs 4 and the remote control ECUs 5 and the battery 114 as well as the authentication control process is performed from a remote location using the wireless signal (switch control signal SS). Therefore, when power is supplied from the battery 114 to the outboard motor ECUs 4 and the remote control ECUs 5, the marine vessel operator does not need to unlock the locked door of the battery chamber using a mechanical key, to open the door, and to directly switch the battery switch 31 from off to on. Accordingly, the work burden on the marine vessel operator is reduced when power is supplied from the battery 114 to the outboard motor ECUs 4 and the remote control ECUs 5 while the authentication control process is performed. According to a preferred embodiment of the present invention, the portable device 1 that performs the authentication control process is used as the portable device 1 that controls opening and closing of the current path 115. Therefore, unlike the case in which the portable device 1 that controls opening and closing of the current path 115 and the portable device 1 that performs the authentication control process are separate from each other, the number of portable devices 1 does not increase, and thus the complex structure of the system 100 is significantly reduced or prevented. Furthermore, the marine vessel operator does not need to carry a plurality of portable devices 1, and it is not necessary to change the plurality of portable devices 1 depending on the application. Thus, the convenience of the marine vessel operation is improved when power is supplied from the battery 114 to the outboard motor ECUs 4 and the remote control ECUs 5 while the authentication control process is performed.

According to a preferred embodiment of the present invention, the portable device operator 14 includes a plurality of operators (the first operator 14*a* and the second operator 14*b*) separate from each other. Accordingly, a plurality of operation functions are assigned to the separate operators (the first operator 14*a* and second operator 14*b*). Therefore, the marine vessel operator selects the operator (the first operator 14*a* or the second operator 14*b*) to be operated according to the operation function intended by the marine vessel operator, and thus the operation function intended by the marine vessel operator is easily executed by the portable device 1.

According to a preferred embodiment of the present invention, the portable device operator 14 includes the first operator 14*a* and the second operator 14*b* separate from the first operator 14*a*. Furthermore, the portable device 1 transmits the open command signal, which is a switch control signal SS to open the current path 115, to the receiving device 2 based on the input operation on the first operator 14*a*, and transmits the close command signal, which is a switch control signal SS to close the current path 115, to the receiving device 2 based on the input operation on the second operator 14*b*. Accordingly, the operation function to switch the current path 115 from a closed state to an open state and the operation function to switch the current path 115 from the open state to the closed state are assigned to the separate operators (the first operator 14*a* and the second operator 14*b*), and thus as compared with the case in which both the operation functions are assigned to one operator, the portable device 1 easily executes the operation function intended by the marine vessel operator. Furthermore, after the marine vessel operator operates the operator, the marine vessel operator confirms whether he or she has operated the first operator 14*a* or the second operator 14*b* such that the marine vessel operator easily recognizes whether the operation function executed by him or her is to open the current path 115 or to close the current path 115.

According to a preferred embodiment of the present invention, the portable device operator 14 receives the input operation to open or close the current path 115 and the input operation to transmit the authentication signal SA. Furthermore, the portable device 1 transmits the switch control signal SS and the authentication signal SA to the receiving device 2 based on the input operation on the portable device operator 14. Accordingly, the marine vessel operator performs the input operation to transmit the authentication signal SA on the portable device operator 14 in the vicinity of an antenna (receiving device 2) that transmits the request signal (portable device confirmation signal SB) such that the antenna (receiving device 2) easily receives the request signal. Furthermore, the portable device operator 14 receives both the input operation to open or close the current path 115 and the input operation to transmit the authentication signal SA. Consequently, both the input operation to open or close the current path 115 and the input operation to transmit the authentication signal SA are received while an increase in the number of operators of the portable device 1 is significantly reduced or prevented. Moreover, an increase in the size of the portable device 1 is significantly reduced or prevented by significantly reducing or preventing an increase in the number of operators of the portable device 1.

According to a preferred embodiment of the present invention, the portable device operator 14 includes a push button. Furthermore, when a long press operation is received in which a period during which an input operation is performed on the push button is the period T1, the portable device 1 transmits the switch control signal SS to the receiving device 2, and when a short press operation is received in which a period during which an input operation is performed on the push button is the period T2 shorter than the period T1, the portable device 1 transmits the authentication signal SA to the receiving device 2. Accordingly, even when a single push button includes the two operation functions, i.e. the operation function to transmit the switch control signal SS to the receiving device 2 and the operation function to transmit the authentication signal SA to the receiving device 2, the length of a period during which the push button is pressed is changed such that the marine vessel operator is able to properly use the two different operation functions. Consequently, the convenience of the marine vessel operator using the portable device 1 is improved while an increase in the number of operators of the portable device 1 (an increase in the size of the portable device 1) is significantly reduced or prevented.

According to a preferred embodiment of the present invention, the push button includes the display (P1 and P3) related to authentication and the display related to opening and closing of the battery switch 31 side by side. Accordingly, the marine vessel operator visually recognizes the display such that the marine vessel operator easily recognizes that the portable device operator 14 including the display receives both the input operation to open or close the current path 115 and the input operation to transmit the authentication signal SA.

According to a preferred embodiment of the present invention, the portable device operator 14 includes the first operator 14*a* and the second operator 14*b* separate from the first operator 14*a*. Furthermore, the portable device 1 transmits the open command signal SO, which is a switch control signal SS to open the current path 115, to the receiving device 2 based on an input operation on the first operator 14*a*, transmits the lock signal SL to perform the lock control to lock at least a portion of the marine vessel 110 as the authentication signal SA to the receiving device 2 based on another input operation on the first operator 14*a*, transmits the close command signal SC, which is a switch control signal SS to close the current path 115, to the receiving device 2 based on an input operation on the second operator 14*b*, and transmits the unlock signal SU to perform the unlock control to unlock the lock control as the authentication signal SA to the receiving device 2 based on another input operation on the second operator 14*b*. Accordingly, an operator through which the open command signal SO and the lock signal SL are transmitted when power supply from the battery 114 to the outboard motor ECUs 4 and the remote control ECUs 5 is stopped is assigned to the first operator 14*a*, and an operator through which the close command signal SC and the unlock signal SU are transmitted when power supply from the battery 114 to the outboard motor ECUs 4 and the remote control ECUs 5 is started is assigned to the second operator 14*b*. Consequently, the marine vessel operator uses only the second operator 14*b* when starting the operation of the marine vessel 110, and uses only the first operator 14*a* when terminating the operation of the marine vessel 110, and thus the portable device operator 14 is prevented from receiving an input operation different from the intention of the marine vessel operator.

According to a preferred embodiment of the present invention, the portable device 1 includes the portable device case 11 in which the portable device operator 14 is disposed. Furthermore, the portable device case 11 includes the first operator 14*a* and the second operator 14*b* adjacent to each other along the longitudinal direction. Accordingly, the first operator 14*a* and the second operator 14*b* are disposed adjacent to each other such that the marine vessel operator easily operates the first operator 14*a* and the second operator 14*b* separately. Furthermore, the first operator 14*a* and the second operator 14*b* are provided adjacent to each other along the longitudinal direction such that as compared with the case in which the first operator 14*a* and the second operator 14*b* are provided adjacent to each other along the short-side direction, the length of the portable device 1 in the direction (longitudinal direction) in which the first operator 14*a* and the second operator 14*b* are adjacent to each other is increased.

According to a preferred embodiment of the present invention, the transmitter 12 that transmits the wireless signal to the receiving device 2 is disposed inside the portable device case 11, and the portable device case 11 is sealed by the seal 11*a*. Accordingly, for example, even when the portable device 1 is placed in water, water is prevented from entering the transmitter 12 inside the portable device case 11.

According to a preferred embodiment of the present invention, the portable device 1 floats on the water surface due to the buoyancy force generated due to the sealed internal space A of the portable device case 11 when the portable device 1 is placed in water. Accordingly, for example, even when the portable device 1 is placed in water, the portable device 1 that has floated on the water surface is easily found and retrieved as compared with the case in which the portable device case 11 is submerged in water. Consequently, the portable device 1 is prevented from being lost.

According to a preferred embodiment of the present invention, the receiving device 2 performs the authentication control process based on the authentication signal SA, and performs a control to open or close the current path 115 by controlling opening or closing of the battery switch 31 disposed in the current path 115 based on the switch control signal SS. That is, the receiving device 2 defines and functions as a controller. Accordingly, one receiving device 2 performs both the authentication control process and the process of controlling opening and closing of the battery switch 31, and thus an increase in the number of controllers is significantly reduced or prevented as compared with the case in which separate devices respectively perform the authentication control process and the process of controlling the opening and closing of the battery switch 31. Furthermore, it is not necessary to provide a controller separately from the receiving device 2, and thus the wireless signal is received, the authentication control process is performed, and the process of controlling the opening and closing of the battery switch 31 is performed while the complex structure of the system 100 is significantly reduced or prevented.

According to a preferred embodiment of the present invention, the system 100 includes the main power supply operation unit 26 disposed in the current path 115 between the battery switch 31 and both the outboard motor ECUs 4 and the remote control ECUs 5. Accordingly, when the battery switch 31 is operated with the portable device 1 and power is supplied to the outboard motor ECUs 4 and the remote control ECUs 5, the main power supply operation unit 26 is operated, and thus power is supplied to the outboard motor ECUs 4 and the remote control ECUs 5 in a state in which the marine vessel operator boards the marine vessel 110 in which the main power supply operation unit 26 is disposed.

According to a preferred embodiment of the present invention, the controller transmits the portable device confirmation signal SB when the battery switch 31 is closed and the main power supply operation unit 26 is off. Furthermore, the portable device 1 includes the receiver 13 that receives the portable device confirmation signal SB, and the portable device 1 transmits the authentication signal SA based on the portable device confirmation signal SB to the receiving device 2. Accordingly, the authentication signal SA is automatically transmitted to the receiving device 2 in response to the portable device confirmation signal SB when the main power supply operation unit 26 is off, and thus an increase in the number of times the marine vessel operator operates the portable device 1 until power is supplied from the battery 114 to the outboard motor ECUs 4 and the remote control ECUs 5 is significantly reduced or prevented.

According to a preferred embodiment of the present invention, the battery 114 is continuously connected to the receiving device 2. Accordingly, it is not necessary to prepare a battery for the receiving device 2 separately from the battery 114 for the marine vessel 110, and thus the complexity of the system 100 is significantly reduced or prevented.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the portable device preferably determines whether or not the input operation on the first operator or the second operator is a long press operation in preferred embodiments described above, the present invention is not restricted to this. For example, the receiving device may alternatively determine whether or not the operation is a long press operation. In such a case, the portable device transmits a first signal as the open command signal SO to the receiving device during the period T1, and transmits a second signal as the close command signal SC to the receiving device during the period T1. Furthermore, the portable device transmits a first signal as the lock signal SL to the receiving device during the period T2, and transmits a second signal as the unlock signal SU to the receiving device during the period T2. In addition, the receiving device compares reception periods of the first signal and the second signal with threshold periods Tt to determine whether or not a long press operation has been performed, distinguishes and acquires the open command signal SO and the lock signal SL, and distinguishes and acquires the close command signal SC and the unlock signal SU.

While the receiving device preferably controls opening or closing of the battery switch based on the switch control signal from the portable device in preferred embodiments described above, the present invention is not restricted to this. For example, as in a system 200 according to a modified example shown in FIG. 11, a receiver 232 that controls opening and closing of a battery switch 31 may be provided in a BMS 203.

Figure 11:
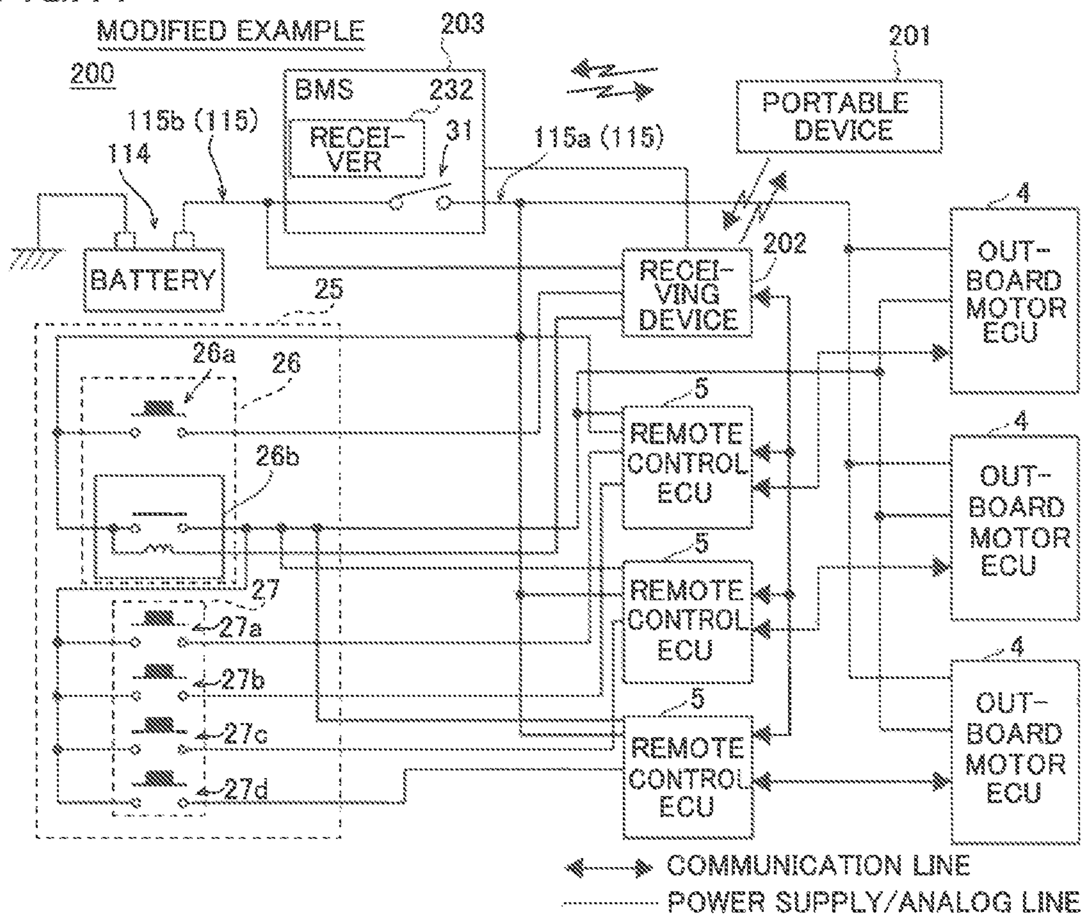
FIG. 11 is a block diagram showing the structure of a control system of a marine vessel according to a modified example of a preferred embodiment of the present invention.

As shown in FIG. 11, the system 200 according to the modified example includes a portable device 201, a receiving device 202, and the BMS 203. The BMS 203 includes the battery switch 31 and the receiver 232, and the receiver 232 receives an open command signal SO and a close command signal SC from the portable device 201. The receiver 232 switches the battery switch 31 of the BMS 203 from a closed state to an open state when receiving the open command signal SO, and switches the battery switch 31 of the BMS 203 from the open state to the closed state when receiving the close command signal SC. Note that the portable device 201 transmits a lock signal SL and an unlock signal SU to the receiving device 202. The receiving device 202 performs a lock control and an unlock control based on the received lock signal SL and unlock signal SU.

While the marine vessel is preferably a small marine vessel and an outboard motor boat in preferred embodiments described above, the present invention is not restricted to this. That is, the marine vessel may alternatively be a large marine vessel, may alternatively include a propeller on the hull without providing outboard motors on the marine vessel, or may alternatively include a jet propulsion unit.

While the receiving device is preferably disposed inside the marine vessel operation unit (console) in preferred embodiments described above, the present invention is not restricted to this. That is, the controller may alternatively be disposed in any portion of a marine vessel body other than the inside of the marine vessel operation unit (console).

While an example of the lock control, a control is shown in which power is supplied from the battery to the outboard motor ECUs and the remote control ECUs in which the engines are not started even when the start/stop operation unit is operated in preferred embodiments described above, the present invention is not restricted to this. That is, the lock control may alternatively be a control in which power is not supplied from the battery to the outboard motor ECUs and the remote control ECUs.

While three outboard motors are preferably provided on the marine vessel in preferred embodiments described above, the present invention is not restricted to this. For example, four or more or less than three outboard motors may alternatively be provided on the marine vessel.

While the portable device operator preferably includes the first operator and the second operator separate from each other in preferred embodiments described above, the present invention is not restricted to this. For example, the portable device operator may alternatively include one operator.

While the portable device preferably transmits the switch control signal based on a long press operation and transmits the authentication signal based on a short press operation in preferred embodiments described above, the present invention is not restricted to this. For example, the portable device may alternatively transmit the switch control signal based on a short press operation and transmit the authentication signal based on a long press operation.

While the portable device preferably transmits the lock signal or the unlock signal based on an input operation on the portable device operator in preferred embodiments described above, the present invention is not restricted to this. For example, the portable device may alternatively transmit the lock signal or the unlock signal regardless of whether or not there is an input operation on the portable device operator, and the portable device operator may alternatively be used only to open and close the battery switch.

While the portable device operator preferably includes a push button in preferred embodiments described above, the present invention is not restricted to this. For example, the portable device operator may alternatively include a touch sensor.

While the receiving device is preferably continuously connected to the battery for the marine vessel in preferred embodiments described above, the present invention is not restricted to this. For example, a dedicated battery for the receiving device may alternatively be prepared separately from the battery for the marine vessel, and the dedicated battery for the receiving device may alternatively be continuously connected to the receiving device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A control system of a marine vessel, the control system comprising:

a portable device including a battery switch operator and that transmits an authentication signal that is a wireless signal including a lock signal to perform a lock control to lock at least a portion of the marine vessel and an unlock signal to perform an unlock control to unlock the lock control based on a locking and unlocking input operation on the battery switch operator; and a receiving device disposed on the marine vessel and that receives the authentication signal from the portable device; wherein the battery switch operator receives an opening and closing input operation that is different from the locking and unlocking input operation to open or close a current path between an engine controller that controls operation of an engine of the marine vessel and a battery;

the portable device transmits a switch control signal, which is a wireless signal to open or close the current path, to the receiving device based on the opening and closing input operation on the battery switch operator; and the control system performs the lock control and the unlock control based on the authentication signal from the portable device, and controls the opening or closing of the current path based on the switch control signal from the portable device.

2. The control system of a marine vessel according to claim 1, wherein the battery switch operator includes a plurality of operators separate from each other.

3. The control system of a marine vessel according to claim 1, wherein the battery switch operator includes a first operator and a second operator separate from the first operator; and the portable device transmits an open command signal, which is the switch control signal to open the current path, to the receiving device based on an opening input operation on the first operator, and transmits a close command signal, which is the switch control signal to close the current path, to the receiving device based on a closing input operation on the second operator.

4. The control system of a marine vessel according to claim 3, wherein the portable device includes a portable device case in which the battery switch operator is disposed; and the portable device case includes the first operator and the second operator adjacent to each other along a longitudinal direction of the portable device case.

5. The control system of a marine vessel according to claim 1, wherein the battery switch operator receives the opening and closing input operation to open or close the current path and the locking and unlocking input operation to transmit the authentication signal; and the portable device transmits the switch control signal or the authentication signal to the receiving device based on the opening and closing input operation or the locking and unlocking input operation, respectively, on the battery switch operator.

6. The control system of a marine vessel according to claim 5, wherein the battery switch operator includes a push button; and the portable device transmits the switch control signal to the receiving device when a long press operation is received in which a period during which the opening and closing input operation is performed on the push button is a first period, and transmits the authentication signal to the receiving device when a short press operation is received in which a period during which the locking and unlocking input operation is performed on the push button is a second period shorter than the first period.

7. The control system of a marine vessel according to claim 6, wherein the push button includes, side by side, a display related to authentication and a display related to opening and closing of a battery switch.

8. The control system of a marine vessel according to claim 5, wherein the battery switch operator includes a first operator and a second operator separate from the first operator; and the portable device transmits:

an open command signal, which is the switch control signal to open the current path, to the receiving device based on an opening input operation on the first operator;

the lock signal to perform the lock control as the authentication signal to the receiving device based on a locking input operation on the first operator;

a close command signal, which is the switch control signal to close the current path, to the receiving device based on a closing input operation on the second operator; and the unlock signal to perform the unlock control to unlock the lock control as the authentication signal to the receiving device based on an unlocking input operation on the second operator.

9. The control system of a marine vessel according to claim 1, wherein the portable device includes a portable device case in which the battery switch operator is disposed;

inside the portable device case, a transmitter is disposed that transmits the wireless signal to the receiving device; and the portable device case is sealed by a seal.

10. The control system of a marine vessel according to claim 9, wherein the portable device case is sealed to define an internal space that is covered; and the portable device is able to float on a water surface due to a buoyancy force generated by the internal space of the portable device case that has been sealed.

11. The control system of a marine vessel according to claim 1, further comprising:

a controller configured or programmed to perform the authentication control process based on the authentication signal, and perform a control to open or close the current path by controlling opening or closing of a battery switch disposed in the current path based on the switch control signal.

12. The control system of a marine vessel according to claim 11, wherein the receiving device defines and functions as the controller.

13. The control system of a marine vessel according to claim 11, further comprising a main power supply switch disposed in a current path between the battery switch and the engine controller.

14. The control system of a marine vessel according to claim 13, wherein the controller is configured or programmed to transmit a portable device confirmation signal when the battery switch is closed and the main power supply switch is off; and the portable device includes a portable device receiver that receives the portable device confirmation signal, and transmits the authentication signal based on the portable device confirmation signal to the receiving device.

15. The control system of a marine vessel according to claim 1, wherein the receiving device is continuously connected to the battery.

16. A portable device for a marine vessel, the portable device comprising:

a battery switch operator; and a transmitter that transmits an authentication signal that is a wireless signal including a lock signal to perform a lock control to lock at least a portion of the marine vessel and an unlock signal to perform an unlock control to unlock the lock control based on a locking and unlocking input operation on the battery switch operator; wherein the battery switch operator receives an opening and closing input operation that is different from the locking and unlocking input operation to open or close a current path between an engine controller that controls operation of an engine of the marine vessel and a battery; and the transmitter transmits a switch control signal, which is a wireless signal to open or close the current path, based on the opening and closing input operation on the battery switch operator.

17. The portable device for a marine vessel according to claim 16, wherein the battery switch operator includes a first operator and a second operator separate from the first operator; and the transmitter transmits an open command signal, which is the switch control signal to open the current path, based on an opening input operation on the first operator, and transmits a close command signal, which is the switch control signal to close the current path, based on a closing input operation on the second operator.

18. The portable device for a marine vessel according to claim 16, wherein the battery switch operator receives the opening and closing input operation to open or close the current path and the locking and unlocking input operation to transmit the authentication signal; and the transmitter transmits the switch control signal or the authentication signal based on the opening and closing input operation or the locking and unlocking input operation, respectively, on the battery switch operator.

19. The portable device for a marine vessel according to claim 18, wherein the battery switch operator includes a push button; and the transmitter transmits the switch control signal when a long press operation is received in which a period during which the opening and closing input operation is performed on the push button is a first period, and transmits the authentication signal when a short press operation is received in which a period during which the locking and unlocking input operation is performed on the push button is a second period shorter than the first period.

20. The portable device for a marine vessel according to claim 18, wherein the battery switch operator includes a first operator and a second operator separate from the first operator; and the transmitter transmits:

an open command signal, which is the switch control signal to open the current path, based on an opening input operation on the first operator;

the lock signal to perform the lock control as the authentication signal based on a locking input operation on the first operator;

a close command signal, which is the switch control signal to close the current path, based on a closing input operation on the second operator; and the unlock signal to perform the unlock control to unlock the lock control as the authentication signal based on an unlocking input operation on the second operator.

* * * * *